US009654334B2

(12) United States Patent
Li et al.

(10) Patent No.: US 9,654,334 B2
(45) Date of Patent: May 16, 2017

(54) SYSTEM AND METHOD FOR FAST COMPATIBILITY VERIFICATION OF REST API BASED ON REST CHART

(71) Applicant: Futurewei Technologies Inc., Plano, TX (US)

(72) Inventors: Li Li, Bridgewater, NJ (US); Wu Chou, Basking Ridge, NJ (US); Wei Zhou, Sandy Bay (AU)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 334 days.

(21) Appl. No.: 14/480,278

(22) Filed: Sep. 8, 2014

(65) Prior Publication Data

US 2015/0074256 A1 Mar. 12, 2015

Related U.S. Application Data

(60) Provisional application No. 61/874,971, filed on Sep. 6, 2013, provisional application No. 61/875,506, filed on Sep. 9, 2013.

(51) Int. Cl.
*G06F 15/173* (2006.01)
*H04L 12/24* (2006.01)
*H04L 29/08* (2006.01)
*G06F 9/44* (2006.01)
*H04L 29/06* (2006.01)

(52) U.S. Cl.
CPC ............ *H04L 41/0213* (2013.01); *G06F 8/10* (2013.01); *H04L 41/0866* (2013.01); *H04L 67/02* (2013.01); *H04L 69/03* (2013.01); *H04L 41/082* (2013.01)

(58) Field of Classification Search
CPC ..... H04L 41/0213; H04L 69/03; H04L 67/02; H04L 41/0866; H04L 41/082; G06F 8/10
See application file for complete search history.

(56) References Cited

U.S. PATENT DOCUMENTS

2014/0244708 A1* 8/2014 Taine .................. H04L 65/40
709/201

OTHER PUBLICATIONS

Title: Web Information Systems and Technologies: 6th International Conference, WEBIST 2010, Valencia, Spain, Apr. 7-10, 2010, Revised Selected Papers; Author: Li Li and Wu Chou,Section: Web Interfaces and Applications,Web: https://books.google.com/books?id=UAzNCwAAQBAJ&pg=PA32&lpg=PA32& dq=REST+Chart+model&source=bl&ots=hAFZmQKflM& sig=el pp. 25-4.*

(Continued)

*Primary Examiner* — Nicholas Taylor
*Assistant Examiner* — Tania Pena-Santana
(74) *Attorney, Agent, or Firm* — Futurewei Technologies, Inc.

(57) ABSTRACT

Various disclosed embodiments include methods and systems for determining whether representational state transfer (REST) application programming interfaces (APIs) are compatible. A method is performed by a processing system that includes a processor. The method comprises obtaining a first REST Chart describing a first version of a REST API and obtaining a second REST Chart describing a second version of a REST API. The method comprises determining whether the first version and the second version are compatible using the first REST Chart and the second REST Chart by determining whether a compatible path exists between the first REST Chart and the second REST Chart.

10 Claims, 5 Drawing Sheets

(56) References Cited

OTHER PUBLICATIONS

Title: REST API Design Patterns for SDN Northbound API (Conferance Paper), Author: Wei Zhou, Li Li, Min Lou and Wu Chou, Date: May 2014, Web: https://www.researchgate.net/figure/269299631_fig1_Fig-3-A-REST-Chart-for-Quantum-REST-API.*

* cited by examiner

| $P_{next}$ | $r_{ij} \in P_{ij}$, cover(P1,P2) | $T_{next}$ | New tuples | Next $P_{next}$ |
|---|---|---|---|---|
| P_tenant_type (OR) | C2:ports∈C1:P_ports_type cover(C1:P_ports, C2:P_ports) | T_ports | ((C2:ports, C1:P_ports_type), (C2:P_ports, C1:P_ports)) | P_ports_type |
| P_ports_type (OR) | C2:port∈C1:P_port_type cover(C1:P_port, C2:P_port) | T_port | ((C2:port, C1:P_port_type), (C2:P_port, C1:P_port)) | P_port_type |
| P_port_type (OR) | cover(C1:P_port_type, C2:P_port_type), cover(C1:P_attachment_type, C2:P_port_type/attachment) | null | ((C2:P_port_type, C2:P_port_type), (C2:P_port_type/attachment, C1:P_attachment_type)) | null |

FIG. 6

SYSTEM AND METHOD FOR FAST COMPATIBILITY VERIFICATION OF REST API BASED ON REST CHART

CROSS REFERENCE TO RELATED APPLICATIONS

This application claims priority under 35 USC 119(e) to U.S. Provisional Application Ser. No. 61/874,971, filed on Sep. 6, 2013, and U.S. Provisional Application Ser. No. 61/875,506, filed on Sep. 9, 2013, each of which is incorporated herein by reference.

TECHNICAL FIELD

The present disclosure relates generally to Representational State Transfer (REST) Application Programming Interface (API).

BACKGROUND

One advantage of REST API is that it promotes independent evolution of clients and servers in a loosely coupled fashion. However, as the REST APIs are evolving with various versions and their new versions often contain significant changes, maintaining backward compatibility of REST APIs has been difficult and has become a problem in REST API applications.

Prior approaches for determining backward compatibility of REST APIs are mostly manual. Once a server publishes a new REST API version, client developers have to read the manual and mentally figure out if any existing client code can be reused with the new REST API. Although the developers can run some automated test suites to determine which parts of the client still work and which parts fail, the tests cannot tell why some tests failed, and how to change the client code to make the client work with the new API when some API messages are still recognizable but re-factored.

SUMMARY

According to one embodiment, there is provided a method for determining whether representational state transfer (REST) application programming interfaces (APIs) are compatible. The method is performed by a processing system that includes a processor. The method comprises obtaining a first REST Chart describing a first version of a REST API and obtaining a second REST Chart describing a second version of a REST API. The method comprises determining whether the first version and the second version are compatible using the first REST Chart and the second REST Chart by determining whether a compatible path exists between the first REST Chart and the second REST Chart.

In another embodiment, there is provided an apparatus for determining whether representational state transfer (REST) application programming interfaces (APIs) are compatible. The apparatus comprises a processor, and memory coupled to the processor comprising instructions that, when executed by the processor, cause the processor to obtain a first REST Chart describing a first version of a REST API, obtain a second REST Chart describing a second version of a REST API, and determine whether the first version and the second version are compatible using the first REST Chart and the second REST Chart by determining whether a compatible path exists between the first REST Chart and the second REST Chart.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 illustrates a diagram of a trace of a sanction_path (C1,C2) process that identifies sanction relations.

DETAILED DESCRIPTION

Figure 1:
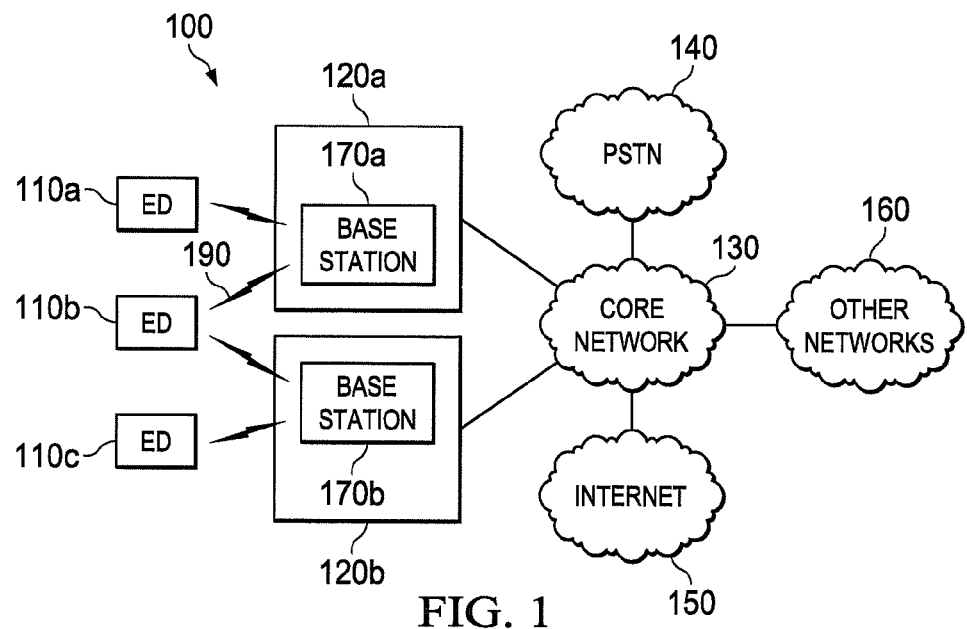
FIG. 1 illustrates a diagram of an illustrative communication system that can implement fast compatibility verification of REST API according to disclosed embodiments.

FIG. 1 illustrates an example communication system 100 that can implement fast compatibility verification of REST API according to disclosed embodiments. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110e, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The EDs 110a-110e are configured to operate and/or communicate in the system 100. For example, the EDs 110a-110e are configured to transmit and/or receive via wireless or wired communication channels. Each ED 110a-110e represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device, all which include and incorporate a browser application.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160.

For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. EDs 110d-110e are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
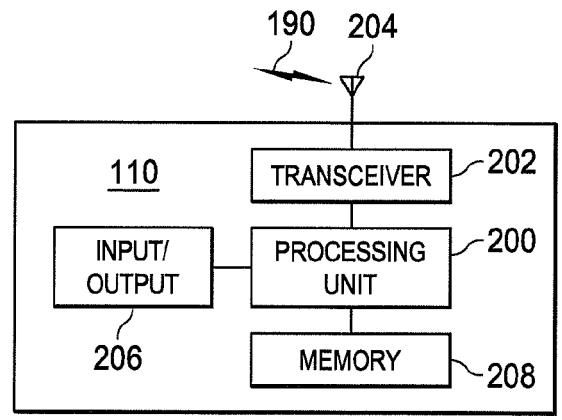
FIGS. 2A and 2B illustrate example devices that can implement fast compatibility verification of REST API according to disclosed embodiments.
Figure 2B:
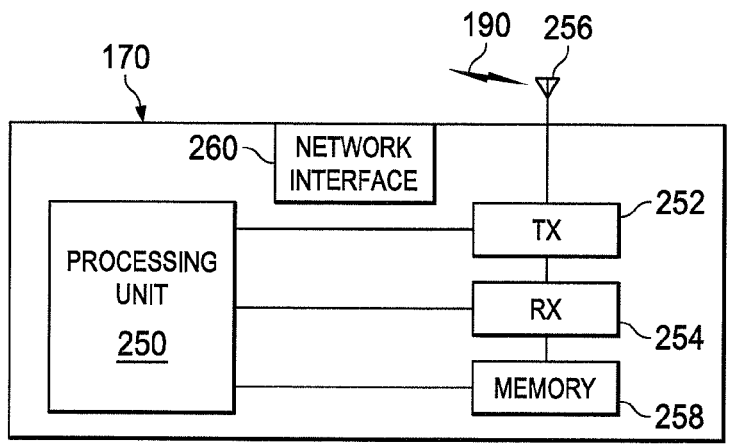

FIGS. 2A and 2B illustrate example devices that may implement the methods and teachings according to this disclosure. In particular, FIG. 2A illustrates an example ED 110, and FIG. 2B illustrates an example server 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, one or more network interfaces 260, and at least one memory 258. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding EDs 110 and base station 170 are known to those of skill in the art. As such, these details are omitted here for clarity.

The present disclosure describes an automated process to test if two versions of REST APIs are compatible based on a REST Chart model. The described process takes two REST Charts C1 and C2, each REST Chart describing a different version of a REST API, and uses the process described herein to determine whether the two different REST APIs are compatible. If the two REST API versions are compatible, the process produces the compatible paths in C2 that can be reached by a client of C1. In addition, the process identifies the relations between C1 and C2 that warrant the compatible paths.

The REST Chart model treats a REST API as a set of type representations connected by transitions. Each transition specifies the possible interactions with the resource referenced by a hyperlink in a type representation. The REST Chart model uses a special kind of Colored Petri Net to define these type representations and transitions. In particular, a type representation becomes a Petri Net place that can have Petri Net tokens denoting resource representations of that type (color). A transition has two input places and several output places (response and faults) and one of the input places contains a hyperlink to the resource. A hypermedia constraint is enforced by the Petri Net transition rules as follows: 1) a transition can be fired if and only if all its input places have the right kind of tokens; 2) after a transition fires, its output place will have the right kind of tokens.

Figure 3:
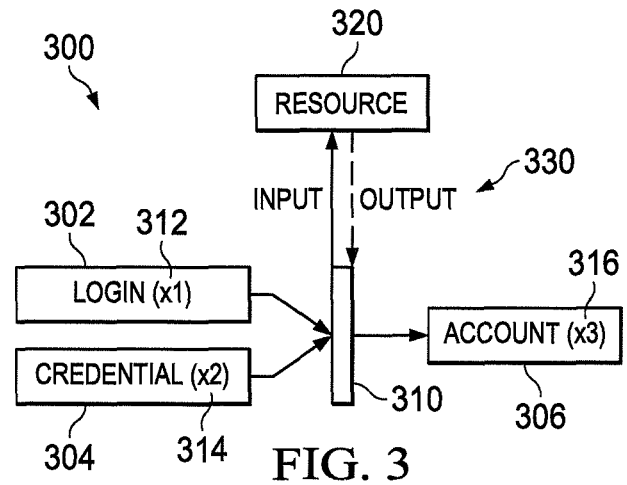
FIG. 3 illustrates a diagram of a REST API represented as a Petri Net according to disclosed embodiments.

To illustrate, assume a REST API for a banking application asking a user agent to login with user name and password in order to access account information. To represent this logic in hypermedia, the login type representation contains a hyperlink to which a user agent can submit the credential data and receive the account information. This REST API may be represented as a Petri Net 300 with three places (type representations) and one transition 310 connecting the three places as illustrated in FIG. 3. As illustrated, the three places comprise a login place 302, a credential place 304, and an account place 306.

The Petri Net 300 indicates that the user agent can transfer its representational state from the login place 302 to the account place 306 aided by the credential place 304. To make the transfer, the user agent first puts a token x1 312 in the login place 302 and a token x2 314 in the credential place 304—it obtains a login document with a hyperlink (x1) and created valid credential data (x2). Then the user agent fires the transition 310 by submitting the credential 304 to a resource 320 at the hyperlink. If the credential 304 is successful, the account resource representation is obtained from the response. As a result, the transition 310 causes the third token x3 316, the account document, to occur in the account place 306.

The effect of this interaction on Petri Net can be modeled by a time delay for the transition. When firing a transition, a user agent uses a client connector to interact with the origin server. A uniform interface 330 may be implemented by the client connector. The interface comprises input and output parameters. In each interaction, the input and output parameters contain: 1) control data (e.g., HTTP verbs and status); 2) optional metadata about the resource representation (e.g., HTTP headers); and 3) an optional resource representation.

In addition, a user agent also needs to know the transfer protocol (e.g., HTTP) in order to call the right client connector. This data comprises the interaction instructions for firing the transitions.

To force a user agent to start from an initial URI, a Petri Net can be marked with one token in the initial place. This marking is also the initial representational state of the user agent. As the user agent fires the enabled transitions based on its selection of hyperlinks, it creates more tokens (resource representations) in different places. These markings represent different representational states of the user agent. In typical situations, the user agent reaches the goal state when a token (e.g., confirmation of a money transfer) occurs in the desired place. The enabled transitions can fire sequentially or concurrently, depending on the search strategy of the user agent.

This Petri Net based approach to REST thus achieves the following goals within one model: 1) its topology defines the transition relations between hypermedia representations of a REST API; 2) its token markings define the representational state space of any user agent that uses the REST API; and 3) its transitions define the possible interactions (data formats and protocols) between the user agent and the resources.

In a particular implementation using the REST Chart model, the backward compatibility problem can be formulated as follows: given a version of REST API described by a REST Chart C1, a special client program P that can reach all places of C1 from the initial place, and a new version of the API described by a REST Chart C2, determine how many places in C1 are reachable in C2 by P.

For P to traverse C1, the following is assumed:
P understands the structures of all places in C1;
P has the ability to select a link from a C1 place to transition to the next place;
P has the ability to carry out the interaction (e.g., deference URI or submit form) required by the C1 transition.

Place Type

The present disclosure assumes each place $P_i$ in REST Chart C can be represented as a tree of elements based on a few primitive types as defined by XML Schema and its tree serialization. Further detail on such XML Schema is published by the World Wide Web Consortium (W3C), and further detail on such tree serialization can be found in "Automatic Message Flow Analyses for Web Services Based on WSDL", Proceedings of 2007 IEEE International Conference on Web Services (ICWS 2007), page 880-887, Salt Lake City, July 2007, Li Li, Wu Chu, the teachings of which are incorporated herein by reference in their entirety.

The tree edges and nodes can be flattened into a set of URIs as follows:

$Rel(P_i, C) = \{r_{ij} | r_{ij} \text{ is a URI}\}$.

For example, if a place represents a read-only document, the URI would represent the service provided by each link. If a place represents an input form, the URI would represent a field name. In any case, $r_{ij}$ provides sufficient information for P to interact with the places (e.g. to follow a link or fill a form).

Cover Relation

A place $P_i$ in REST Chart C1 covers a place $P_j$ in REST Chart C2, denoted by:

$cover(P_i, P_j) = true \text{ iff } Rel(P_j, C2) \subseteq Rel(P_i, C1)$.

In other words, when a client P sees $P_j$ in C2, it understands how to interact with it based on its prior knowledge of $P_i$ in C1. This relation can be extended to partial coverage where part of a place covers part of another place, denoted by $cover(P_i/part_i, P_j/part_j)$.

Sanction Function

It is assumed that there is a function place=find(chart, condition), whose algorithm is not defined herein, that can find places in a REST Chart that satisfy the given condition defined based on the above place type and cover relation.

DEFINITION

The places in a REST Chart are divided into one of two types as follows:

1. OR place: a REST client needs to understand ANY relational URI in the place. As an illustrative example, an "OR" place may be a web page having multiple links that a user can choose between;

2. AND place: a REST client must understand ALL relational URIs in the place. As an illustrative example, an "AND" place may be an online form with multiple sections that need to be filled in (e.g., name, address, etc.).

The present disclosure assumes that all URIs in an OR place are context-free such that their meanings remain the same when they occur in different places of a REST Chart and in different versions of REST Charts. REST APIs that satisfy this condition promote separation of identification from representation such that the REST APIs can reuse the relational URIs to facilitate backward compatibility.

On the contrary, the URIs in an AND place are assumed to be context-sensitive and cannot be separately understood by P. In other words, two different AND places, P1 and P2, may use the same relation to mean different things. However, if a client P understood all relations in P1, it can understand P2 if the relations of P2 is a subset of the relations in P1. In other words, if P understands P1, and cover(P1, P2) is true, then P understands P2. This restriction prevents client P from pretending to understand P2 by mixing relations from some unrelated places in C1.

The present disclosure describes a process to simulate a client program P that tries to visit all places of C2 by only knowing places of C1. The process begins at the initial place of REST Chart C2 and tries to fire as many of its transitions as possible while the transition firings are sanctioned by REST Chart C1.

The following function starts at the initial place of C2 and calls a recursive function to visit all C2's places:

```
Function sanction_path (C₁, C₂) {
    1. P₀ = the initial place of C₂;
    2. P₀.token = 1;
    3. Return visit_place (P₀);
}
```

Figure 4:
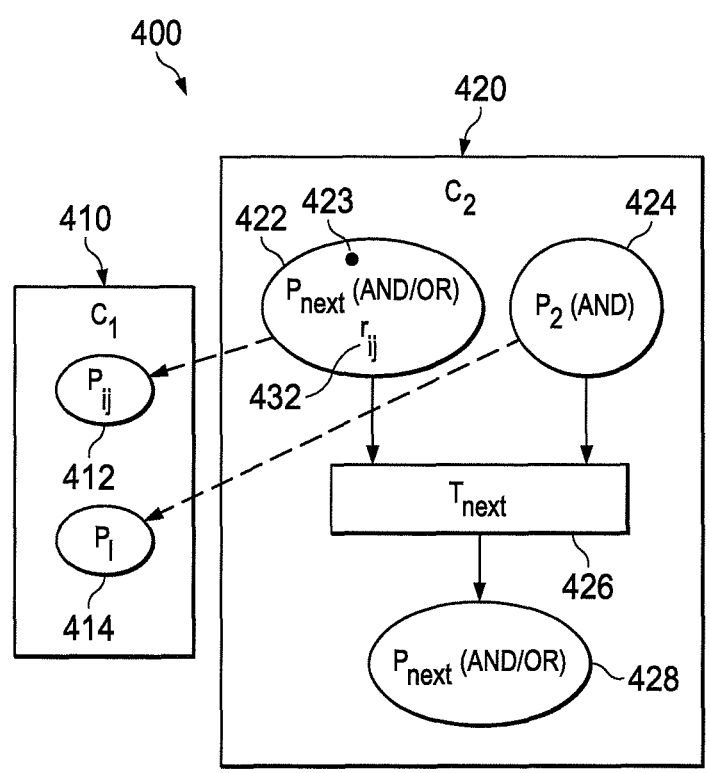
FIG. 4 illustrates a diagram of an illustrative example of a system depicting sanctioning the firing of a transition in a first REST Chart by places in a second REST Chart according to disclosed embodiments.

Now turning to FIG. 4, there is illustrated a system 400 depicting sanctioning the firing of a C2 transition by C1 places. The system 400 includes a first REST Chart (C1) 410 and a second REST Chart (C2) 420. The configuration of C2 420 is illustrated in FIG. 4 after initialization. C2 420 includes a first Pnext place 422, an incoming place P2 424, a Tnext transition 426 that receives the first Pnext place 422 and the P2 place 424, and a second Pnext place 428. As illustrated, a token 423 is in the first Pnext place 424, 0 token in the P2 place 424, and a determination is made whether the Tnext transition 426 can fire.

To determine whether the Tnext transition can fire, a determination of the type of the first Pnext place 422 is performed. If the type of the first Pnext place 422 is OR, it means the client P has to follow an rij link 432 in the first Pnext place 422. Because P only understands C1 410, a determination is made whether rij occurs in a place in C1 410. For example, a determination may be made whether rij occurs in a first place 412 in C1. If so, then an attempt is made to fire the Tnext transition 426 as described in further detail below. If the type of the first Pnext place 422 is AND, it means the client P has to know all the relations (e.g., form fields) in the first Pnext place 422. Because P only understands C1, a determination is made whether Pnext is covered by a place in C1. If so, then an attempt is made to fire the Tnext transition as described in further detail below.

To try to fire the Tnext transition 426, a determination is made whether P2 424, the second incoming place, is also covered by C1 for the same reason. For example, a determination may be made whether a similar message as associated with P2 424 occurs in a second place 414 in C1. If so, a token is inserted in P2 424 and the Tnext transition 426 is fired (e.g., because both "conditions" input to the Tnext transition 426 have been met). Thereafter, the process moves to the outgoing place of Tnext (e.g., the second Pnext place 428) and the process is repeated until no more transitions can fire in C2 420. As will be appreciated, the first Pnext place 422 may be associated with a message from a server in a network and the place P2 424 may be associated with a message that a client in the network is supposed to send to the server. Examples of pseudo code of the steps described above is provided below as two recursive functions as follows:

```
Function visit_place(P_next) {
    1. If Pnext.type == OR then:
        a. Places = { };
        b. For each rij in Rel(Pnext, C2):
            i. Pij = find(C1, rij ∈ Rel(Pij, C1));
            ii. If Pij is found then:
                1. Tnext = outgoing transition of rij;
                2. Places += fire_transition((rij, Pij), Tnext);
    2. If Pnext.type == AND then:
        a. Pij = find(C₁, cover(Pij, Pnext));
        b. If Pij is found then:
            i. Tnext = outgoing transition of Pnext;
            ii. Places = fire_transition((Rel(Pnext, C2), Pij), Tnext);
    3. Return Places;
}
```

```
Function fire_transition(Rnext, Tnext) {
    1. If Tnext == null then return (Rnext, { });
    2. P2 = second incoming AND place of Tnext;
    3. P1 = find(C₁, cover(P1, P2));
    4. Pnext = outgoing place of T_next;
    5. If P1 is found And Pnext.token == 0 then:
        a. P2.token = 1;
        b. Pnext.token = 1;
        c. return (Rnext, (Rel(P2, C2), P1)) + visit_place(Pnext);
    6. Else return (Rnext, ( ));
}
```

The functions described above collect sequences of places of C2 420 sanctioned by C1 410 as sequences of tuples. For two REST Charts of N and M places, the time complexity of the process is O(N*M), because for each place of C2 420, the process checks at most N places of C1 410.

Figure 5:
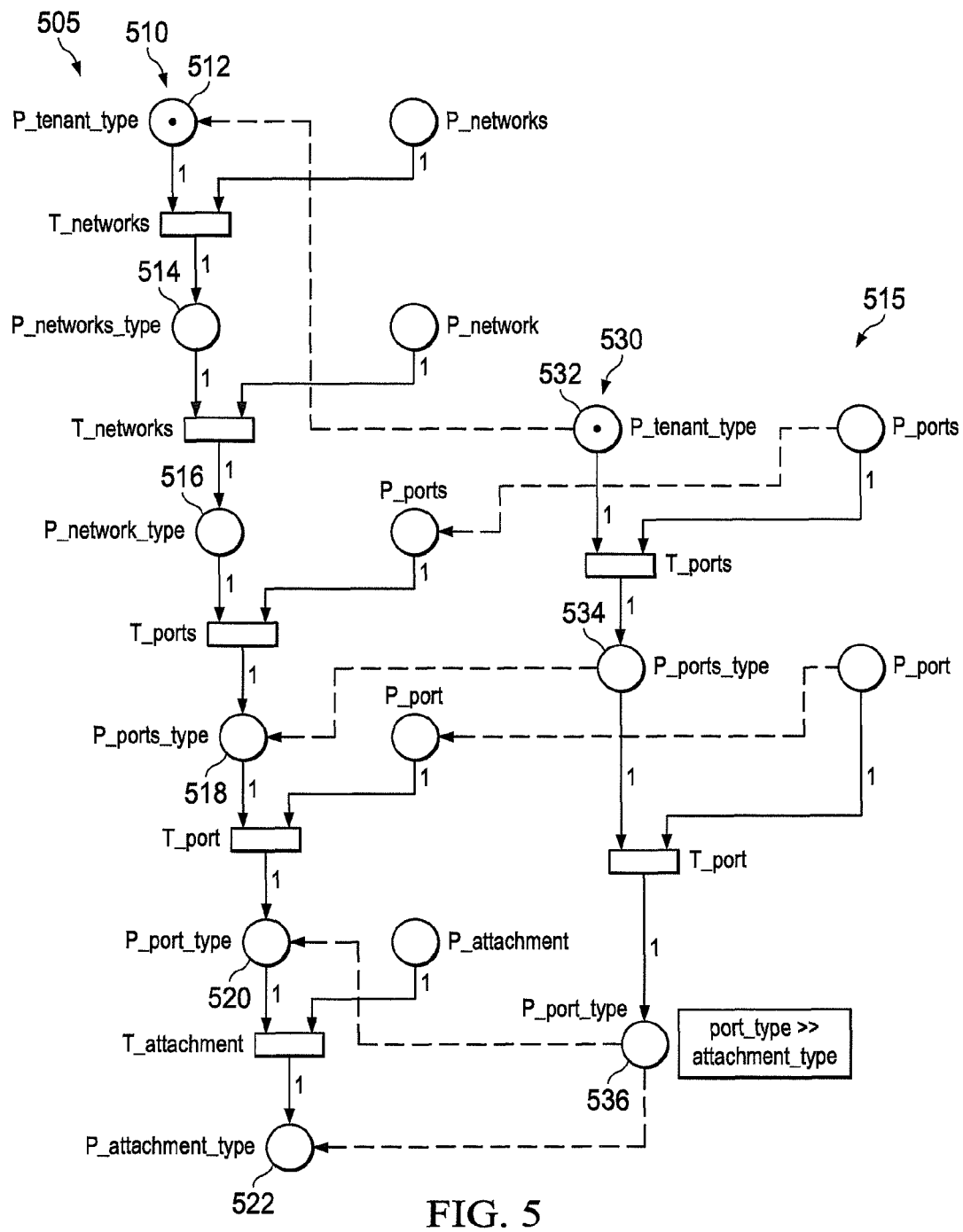
FIG. 5 illustrates a diagram of an illustrative side-by-side comparison of a first version of a REST Chart and a second version of a REST Chart according to disclosed embodiments.

As an illustrative example, and based on a REST API migration analysis, portions of the REST Charts for REST API v1.0 and v2.0 are depicted in FIG. 5 for side-by-side comparison. API v2.0 re-factors the REST API in two ways:

1. The path to port_type is changed between the versions: in v1.0 505, the path 510 is: tenant_type 512, networks_type 514, network_type 516, ports_type 518, port_type 520, attachment_type 522, whereas in v2.0 515, the path 530 is shortened to: tenant_type 532, ports_type 534, port_type (attachment_type) 536.

2. The path to attachment_type 522 is changed between the versions: in v1.0 505, attachment_type 522 has its own representation, whereas in v2.0 515, it is contained within the port_type (e.g., port_type (attachment_type) 536).

If C1 is the v1.0 505 and C2 is the v2.0 515, the sanction relations are shown as the "dotted arrows" from C2 places to C1 places in FIG. 5. The trace of the sanction_path(C1, C2) process that identifies these sanction relations is outlined in the table illustrated in FIG. 6. For example, entries in column 610 are associated with the message being examined (e.g., path 530 of FIG. 5 for REST API v2.0 (tenant_type, ports_type, and port_type). Entries in column 620 are associated with the message in C1 that covers (e.g., is similar to) the message in C2. Entries in column 630 are associated with the transition being examined. Entries in column 640 (e.g., tuples) are associated with mapping between the C2 and C1 messages (e.g., the "dashed arrows" in FIG. 5). The tuples show the representations (places) of C2 that also occur in C1 such that they can be understood by C1 clients. Entries in column 650 are associated with the "next" message to be examined. For example, using the path 530 as an illustrative example, if the "current" Pnext message is P_tenant_type, the "next" Pnext message is P_ports_type. The "null" message in the column 650 indicates that no more transitions can fire in C2.

Figure 7:
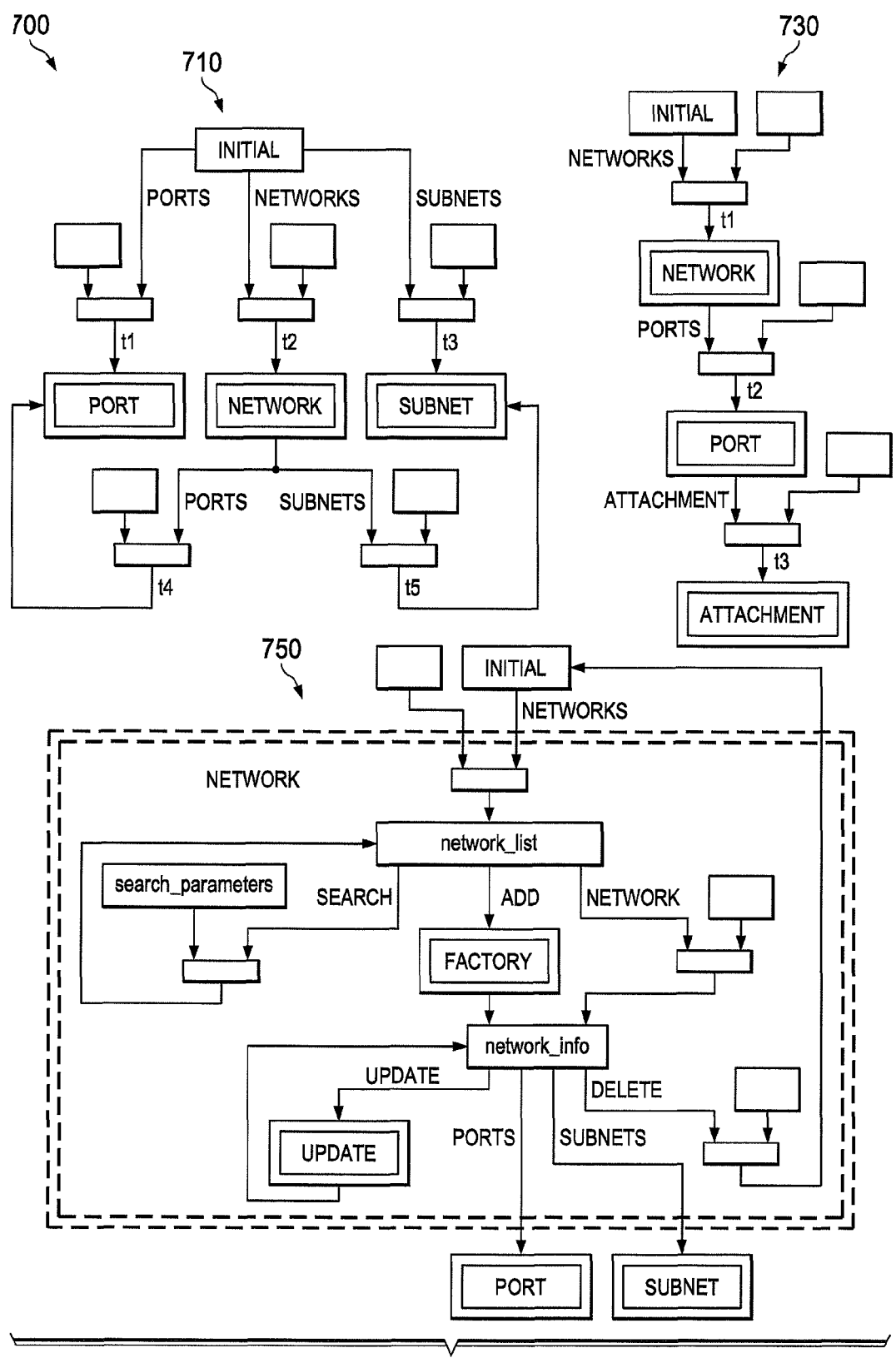
FIG. 7 illustrates a diagram of a modeling framework of SDN (Software-Defined Networking) Northbound REST API and illustrative Hierarchical REST Chart based on disclosed embodiments.

FIG. 7 illustrates a modeling framework of SDN (Software-Defined Networking) Northbound REST API and illustrative Hierarchical REST Chart based on disclosed embodiments. The modeling framework 700 includes a first REST API 710, a second REST API 730, and a third REST API 750. The first REST API 710 illustrates a "top-level" REST API to describe network resources including port, network, and subnet resources. As illustrated, each of the port, network, and subnet resources comprises a hierarchical REST Chart as illustrated by the "double box" around those resources. The second REST API 730 illustrates a different version of the first REST API 710. The third REST API 750 illustrates a more detailed diagram of the network resource of the First API 710.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for determining whether representational state transfer (REST) application programming interfaces (APIs) are compatible, the method performed by a processing system that includes a processor, the method comprising:
obtaining a first REST Chart describing a first version of a REST API;
obtaining a second REST Chart describing a second version of a REST API, the second version separate and distinct from the first version; and
determining whether the first version and the second version are compatible using the first REST Chart and the second REST Chart by determining whether a compatible path exists between the first REST Chart and the second REST Chart,
wherein a type representation is defined by a Petri Net place having a place type, the place type comprises one of an OR place type and an AND place type, an OR place type is associated with a REST client understanding any relational universal resource indicator (URI) in a given place and an AND place type is associated with the REST client understanding all relational URIs in the given place.

2. The method in accordance with claim 1, wherein the first REST Chart represents the first version of the REST API as a first set of type representations connected by transitions and the second REST Chart represents the second version of the REST API as a second set of type representations connected by transitions.

3. The method in accordance with claim 1, wherein determining whether a compatible path exists between the first REST Chart and the second REST Chart comprises determining whether a given transition in the second REST chart can fire.

4. The method in accordance with claim 3, wherein determining whether a given transition in the second REST chart can fire comprises:
determining the place type of a given place in the second REST Chart;
if the place type of the given place is an OR place type:
determining whether at least one of the relational URIs in the given place occurs in a place in the first REST Chart and if so, attempting to fire the given transition based on a value of a token within the given place;
if the place type of the given place is an AND place type:
determining whether each of the relational URIs in the given place occurs in a place in the first REST Chart and if so, attempting to fire the given transition based on a value of a token within the given place.

5. The method in accordance with claim 4, wherein the given transition receives input from a first given place in the second REST Chart and a second given place in the second REST Chart, wherein the given transition is fired based on the value of the token in the first given place and the value of the token in the second given place.

6. An apparatus for determining whether representational state transfer (REST) application programming interfaces (APIs) are compatible, the apparatus comprising:
- a processor: and
- memory coupled to the processor comprising instructions that, when executed by the processor, cause the processor to:
  - obtain a first REST Chart describing a first version of a REST API;
  - obtain a second REST Chart describing a second version of a REST API, the second version separate and distinct from the first version;
  - determine whether the first version and the second version are compatible using the first REST Chart and the second REST Chart; and
  - determine whether a compatible path exists between the first REST Chart and the second REST Chart,
- wherein a type representation is defined by a Petri Net place having a place type, wherein the place type comprises one of an OR place type and an AND place type, wherein an OR place type is associated with a REST client understanding any relational universal resource indicator (URI) in a given place and an AND place type is associated with the REST client understanding all relational URIs in the given place.

7. The apparatus in accordance with claim 6, wherein the first REST Chart represents the first version of the REST API as a first set of type representations connected by transitions and the second REST Chart represents the second version of the REST API as a second set of type representations connected by transitions.

8. The apparatus in accordance with claim 6, wherein determining whether a compatible path exists between the first REST Chart and the second REST Chart comprises instructions that, when executed by the processor, cause the processor to determine whether a given transition in the second REST chart can fire.

9. The apparatus in accordance with claim 8, wherein determining whether a given transition in the second REST chart can fire comprises instructions that, when executed by the processor, cause the processor to:
- determine the place type of a given place in the second REST Chart;
- if the place type of the given place is an OR place type:
  - determine whether at least one of the relational URIs in the given place occurs in a place in the first REST Chart and if so, attempt to fire the given transition based on a value of a token within the given place;
- if the place type of the given place is an AND place type:
  - determine whether each of the relational URIs in the given place occurs in a place in the first REST Chart and if so, attempt to fire the given transition based on a value of a token within the given place.

10. The apparatus in accordance with claim 9, wherein the given transition receives input from a first given place in the second REST Chart and a second given place in the second REST Chart, wherein the given transition is fired based on the value of the token in the first given place and the value of the token in the second given place.

* * * * *